United States Patent [19]

Bath

[11] Patent Number: 4,598,399
[45] Date of Patent: Jul. 1, 1986

[54] MULTICHANNEL MULTISITE SIGNAL PROTECTION CHANNEL SWITCHING APPARATUS

[75] Inventor: David E. Bath, Richardson, Tex.

[73] Assignee: Rockwell International Corporation, El Segundo, Calif.

[21] Appl. No.: 673,638

[22] Filed: Nov. 20, 1984

[51] Int. Cl.⁴ .......................... H04J 1/10; H04J 3/08; H04J 1/16; H04J 3/14
[52] U.S. Cl. .................................... 370/55; 370/16; 370/97; 179/175.31 R
[58] Field of Search ....................... 370/55, 96, 85, 97, 370/16; 179/175.31 R

[56] References Cited

U.S. PATENT DOCUMENTS

3,588,700  6/1971  Shiki et al. ........................... 370/55
4,046,964  9/1977  Daugherty et al. ................. 370/55

Primary Examiner—Douglas W. Olms
Assistant Examiner—Wellington Chin
Attorney, Agent, or Firm—Bruce C. Lutz; V. L. Sewell; H. Fredrick Hamann

[57] ABSTRACT

A way to reduce costs in a communication network is to use through-repeaters for any signal channels that do not need to have data dropped or inserted at a given site. This however complicates any protective switching involved to bridge failed data channels. The present system incorporates a master computer at one end of the switching network which communicates to a plurality of slave computer controllers at all the remaining sites having drop and insert channels whereby it can maintain an up to date table of the system configuration and thereby use segments of the protection channel to bridge various failed portions of the entire system.

5 Claims, 12 Drawing Figures

MULTICHANNEL MULTISITE SIGNAL PROTECTION CHANNEL SWITCHING APPARATUS

THE INVENTION

The present invention is generally directed to electronics, and more specifically directed to communications switching systems. Even more specifically, the present invention is directed to a communication switching system normally incorporating through-repeaters for many or even a majority of the channels of communication at an intermediate site in a communication link. In other words, those channels which do not require the dropping or inserting of data at that site.

BACKGROUND

Many prior art switching systems have used protection channels which can be switched in to bridge failed sections of normal operating channels. Typically, these prior systems have had data drop and insert capability for every single channel in the switching system and thus the master controller can merely check to see whether or not the protection channel for a given link is being used to bridge another failed channel before switching in the protection channel to bridge the most recently failed channel. If there are 20 terminals or sites including the end sites in a particular switching system, that means there are 19 possible sections of protection channel which may be used to bridge failed sections since each section would only involve the distance between adjacent serially connected drop and insert communication sites. The cost of the drop and insert circuitry for a channel which is not receiving or dropping information at a given site is much higher than the cost of a through-repeater which merely provides amplification of the signal on to the next site. It is thus desirable from a cost standpoint to be able to use through-repeaters on all channels which are not receiving or dropping information at a given site. This, however, introduces severe complications in providing protection to any failed section since the unit providing the switching must either know or find out what the length of the failed section is between drop and insert points for that channel and thus use that length of protection channel to bridge the failed section. An alternative is, of course, to switch the signal from the failed channel to a nonfailed channel.

SUMMARY OF THE INVENTION

Although it appears others have considered approaches to solving the cost problem, no one else, to the best of the present inventor's knowledge, has successfully reduced such an idea to practice in view of the difficulties in keeping track of the system configuration and providing a reasonable amount of protection for the switching system. The present invention utilizes a master controller at one end site and a slave controller at each remaining site containing drop and insert equipment along with a protection channel which has drop and insert capability at each drop and insert site intermediate to the end sites. The protection channel is used as the communication device between the master controller and the slave controllers since, if the protection channel is not operable, there is no need for providing the protection channel switching. The master controller periodically polls all of the slave controllers to obtain an update of the status of each of the channels at each of the sites and keeps this information in a table in the master controller. Additionally, each slave immediately reports a change in status. In this way, when a request from a slave controller arrives requesting bridging of a failed channel, the master controller can check the configuration table, quickly ascertain the length of protection channel needed, check to see whether or not that length and portion of the protection channel is available and then notify the slave controllers at drop site sections of each end of the failed channel to switch data signals to the protection channel.

It is therefore an object of the present invention to provide a more cost effective and improved switching system for a communication link and, in particular, a communication link involving light wave or light beams although the inventive concept is not restricted thereto.

Other objects and advantages will be apparent from the reading of the specification and appended claims in conjunction with the drawings wherein;

DETAILED DESCRIPTION

Figure 1:
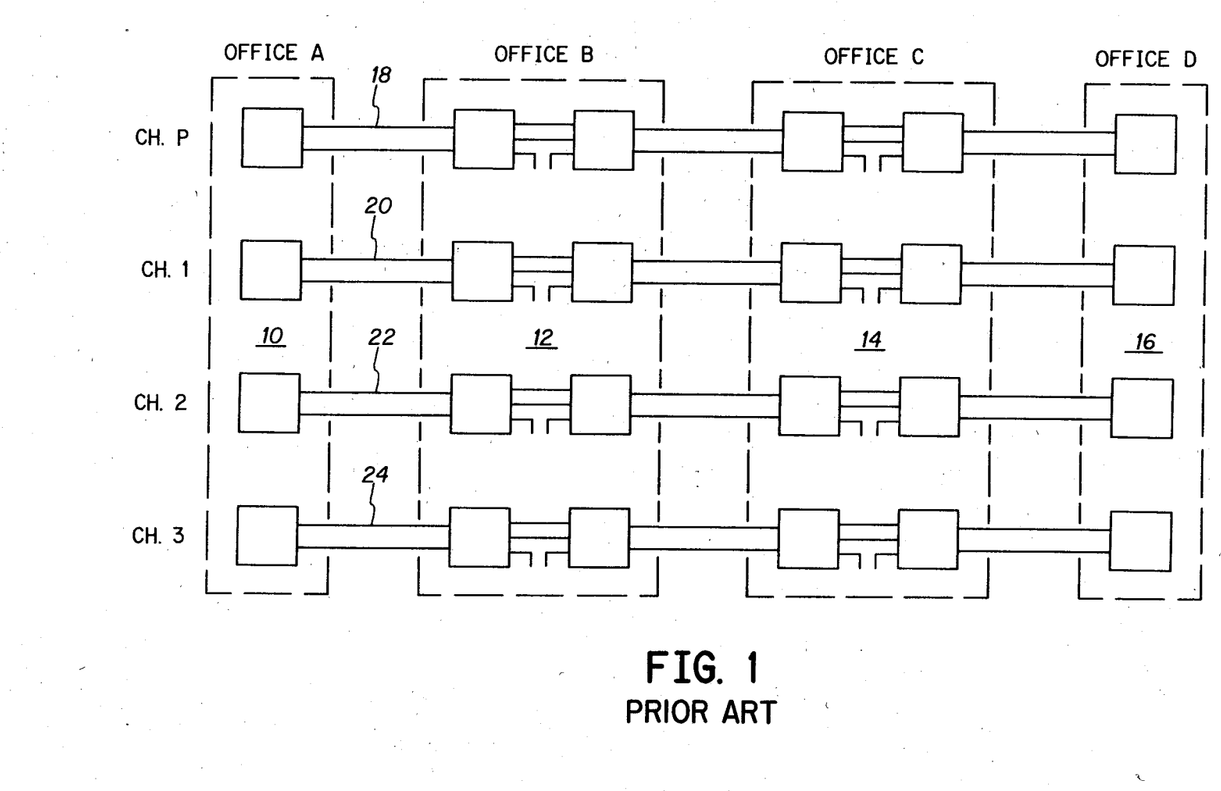
FIG. 1 is a block diagram of a typical prior art terminal-to-terminal, switching system including a protection channel.

In FIG. 1 prior art multisite serially connected set of communication links is illustrated where each terminal has drop and insert capability for each channel. As illustrated, office A on the west end is designated as 10 while office B, which is the next site in the serial connection proceeding toward office D on the east end, is given designation 12, the next office 14 or C and the east end office 16. As will be realized, the presentation is a very simplified version of a switch which, in some instances, would have 20 to 30 data drop and/or insert sites between the east and west end. As illustrated, there is a protection channel P or first channel 18, a channel 1 designated as 20, a channel 2 designated as 22 and a channel 3 designated as 24. The east and west ends 10 and 16 are the final signal destination to a substation or a main switch office and the intermediate points only have drop and insert on some of the channels even though the capability exists on all channels. An example of use might be that office A would be located in Minneapolis, Minnesota while office D would be in Chicago and the intermediate offices would be at various points in between where signals needed to be dropped or inserted.

Figure 2:
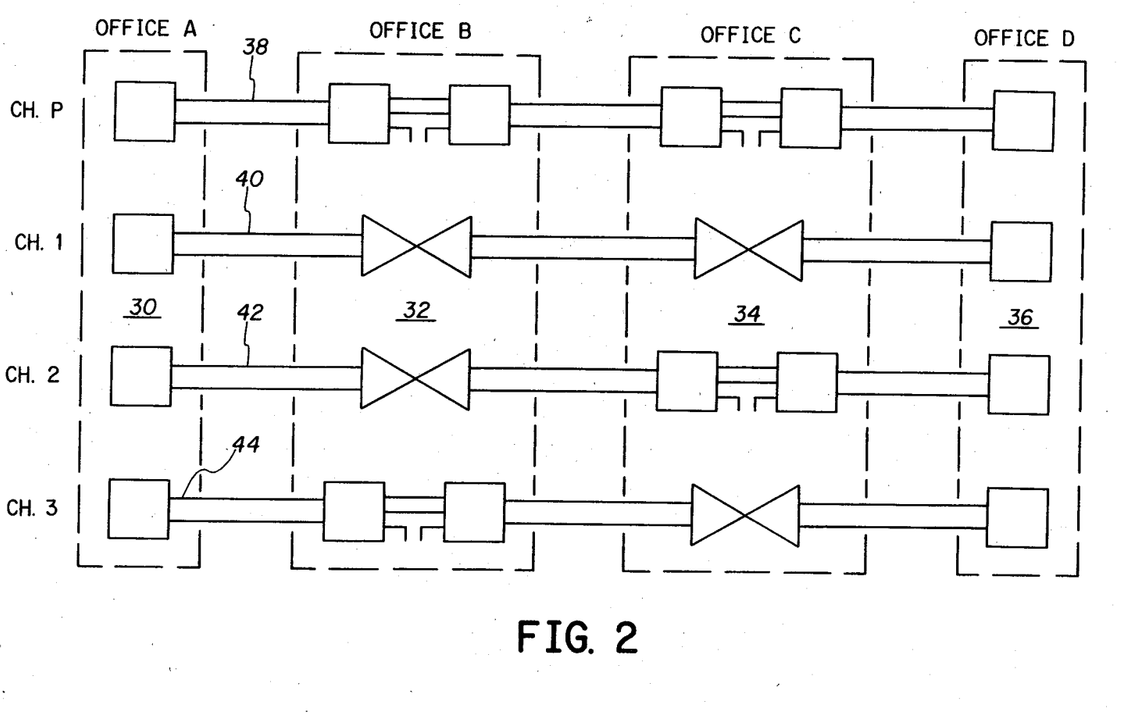
FIG. 2 illustrates an overall block diagram of a switch, as configured with the present inventive concept, having signal channel through-repeaters at sites intermediate the end sites wherein there is no requirement for the dropping of data from or inserting of data to a data channel.

FIG. 2 is laid out similarly to FIG. 1 with offices A through D designated as 30, 32, 34, and 36. The protection channel is designated 38 with channels 1, 2, and 3 being redesignated as 40, 42, and 44. As illustrated channel 40 uses through-repeaters for all the sites between the east and west end, sites 30 and 36, whereas 42 only has drop and insert capability at site 34 and channel 44 has drop and insert capability only at site 32. The signals on channel 42 are merely amplified at site 32 in each direction and thus any failure at any point between sites 30 and 34 require the protection channel 38 be used to bridge the entire distance from site 30 to site 34. However, a failure between site 34 and 36 for channel 42 would only require the corresponding section of the protection channel.

Figure 3:
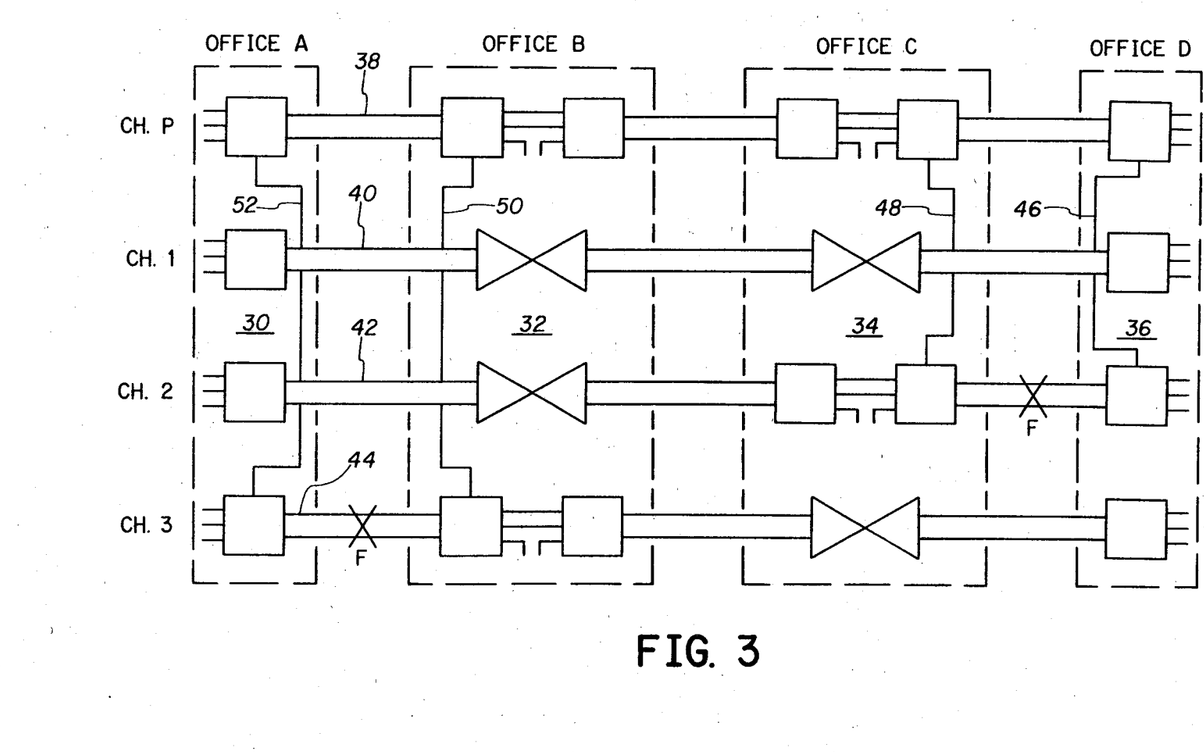
FIG. 3 illustrates the system of FIG. 2 with some of the channels failed and bridged by the protection channel.

FIG. 3 uses numbering identical to that of FIG. 2 where appropriate. FIG. 3 in addition illustrates connection leads 46 and 48 connecting circuitry in block 36 for channel 42 to the protection channel 38 and back to the circuity in block 34 to provide a bridging of a failed section F of channel 42. The leads 50 and 52 provide a similar protection feature for bridging a failed section F of channel 44 between the office 30 and office or signal drop site 32.

Figure 4:
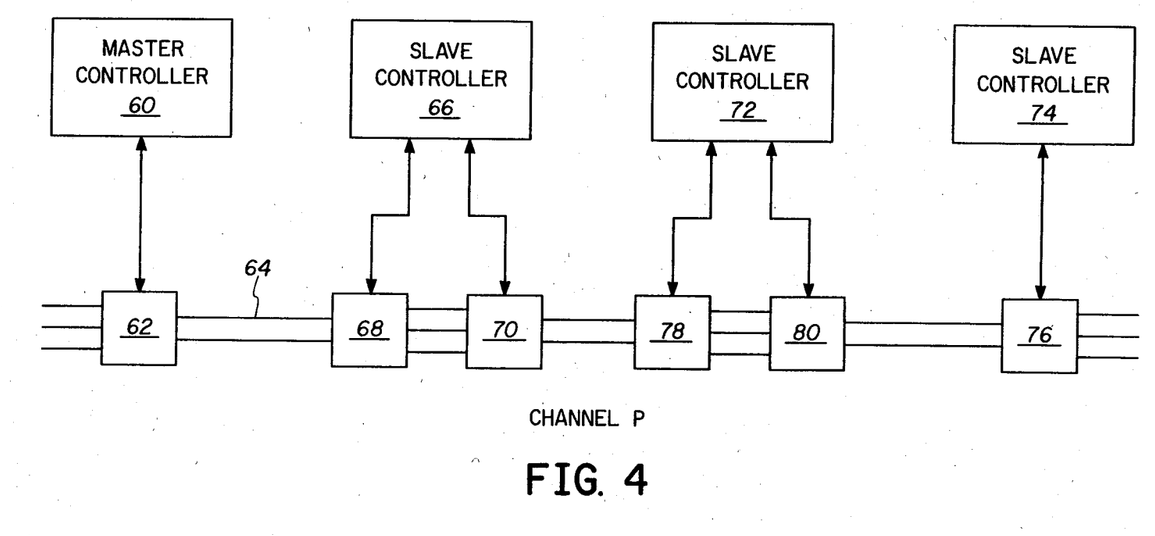
FIG. 4 illustrates the communications concept between the master controller and the slave controllers on the protection channel P in the switching system.

In FIG. 4 a master controller designated as 60 is connected to P channel termination circuitry 62 for P channel 64. A slave controller 66 is connected to terminating devices 68 and 70 at a first intermediate site between the east and west end. Two further slave controllers 72 and 74 ar also illustrated. Slave controller 74 is connected to a single termination means 76 since it is on the east end of the communication link while slave controller 72 is connected to termination means 78 and 80. The various controllers communicate through the us of overhead bits on the protection channel and do not interfere with the main data communications also supplied over the protection channel when it is used to bridge failed data channels in the system.

Figure 5:
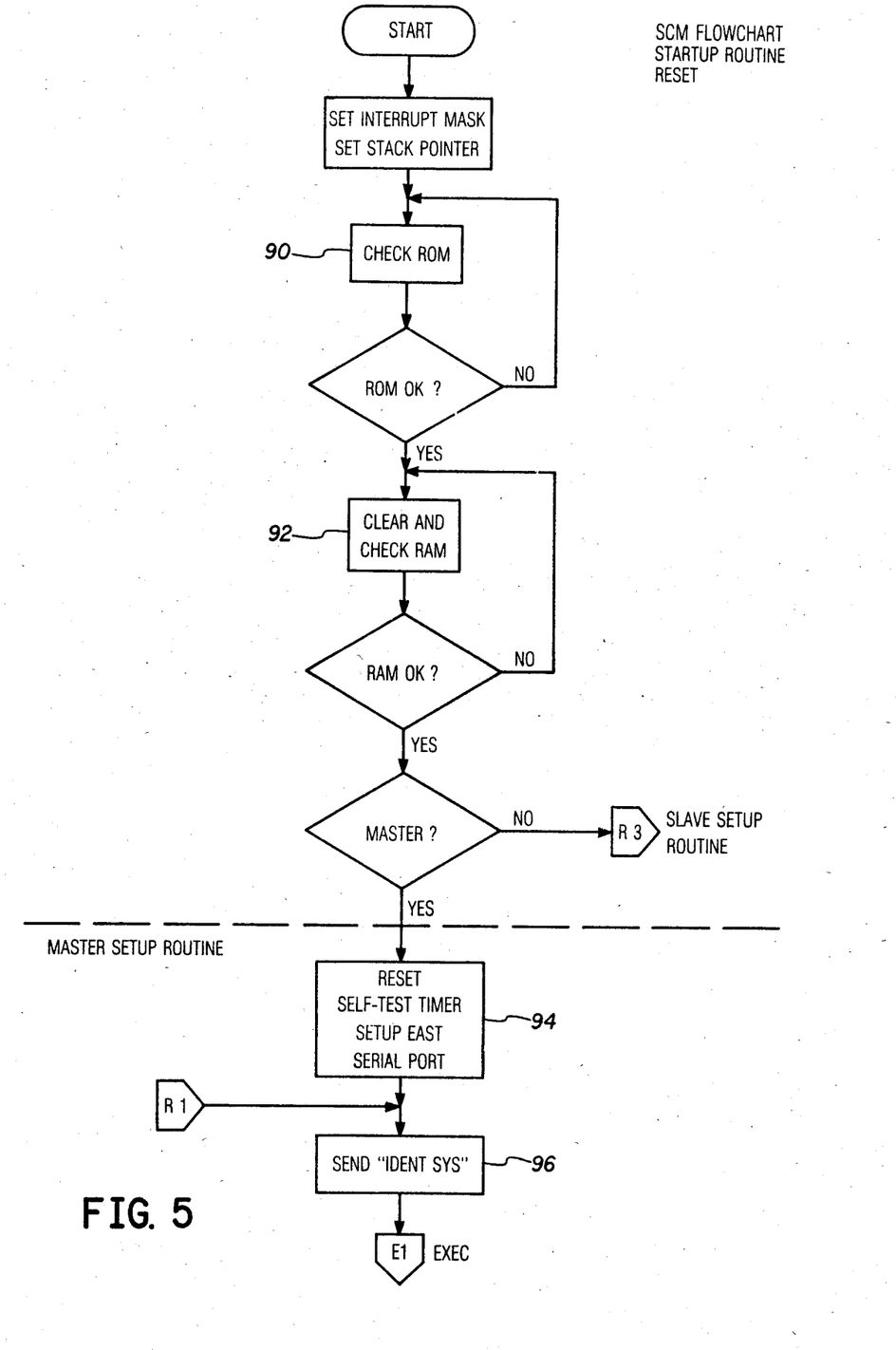
FIGS. 5 through 12 are firmware flow charts for illustrating the interaction between the master controller and the slave controllers in providing the protection switching of the present invention.
Figure 7:
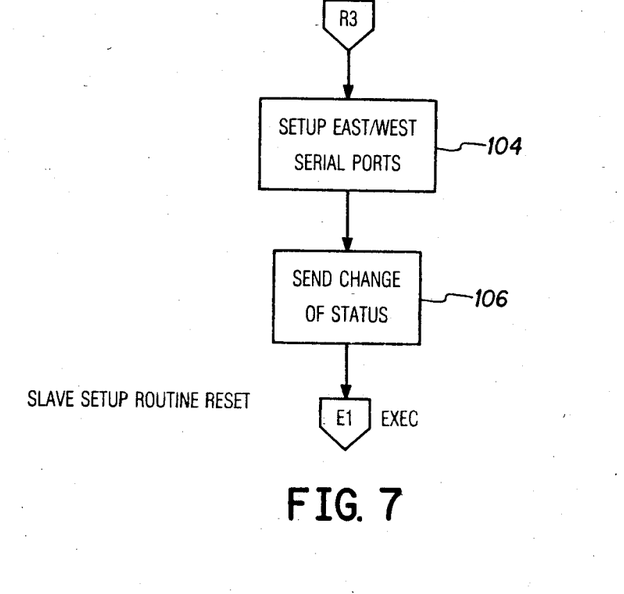

In FIG. 5, the top half above the dash line is the switching module flow chart for start up routines where the system checks the ROM and RAM as illustrated in blocks 90 and 92. If these checks turn out to be okay, the device checks to see whether or not it is configured as a master, in which case it continues to the block 94, or else it proceeds to a slave setup routine as shown in FIG. 7. If the unit is a master, it resets a self-test timer and sends a message as shown in block 96 down the protection channel line to be received and acted upon by each successive slave controller. The master then continues to the executive routine of FIG. 9 where it waits for a response to the identity request sent out according to block 96 of FIG. 5.

Figure 6:
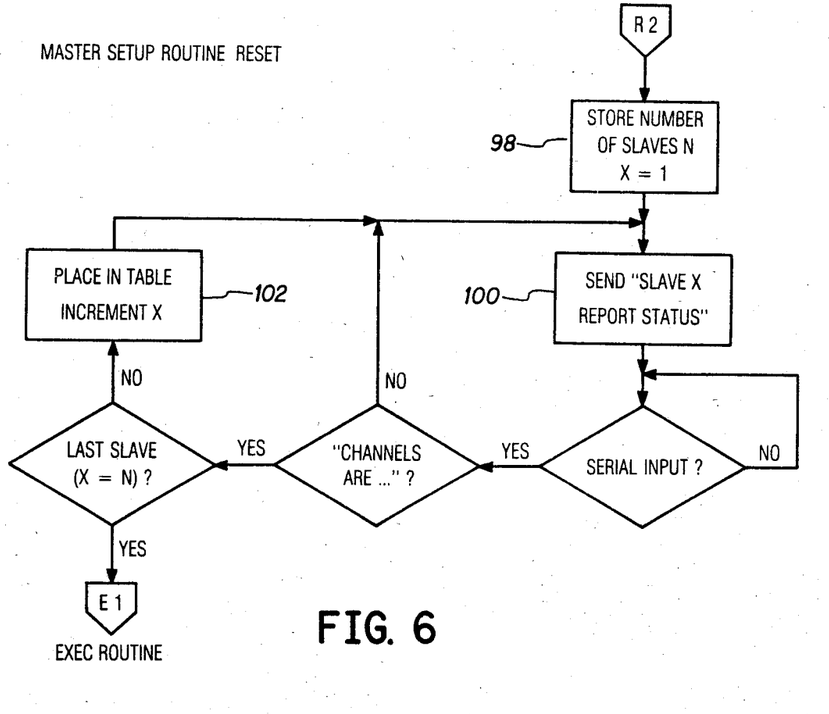
Figure 11:
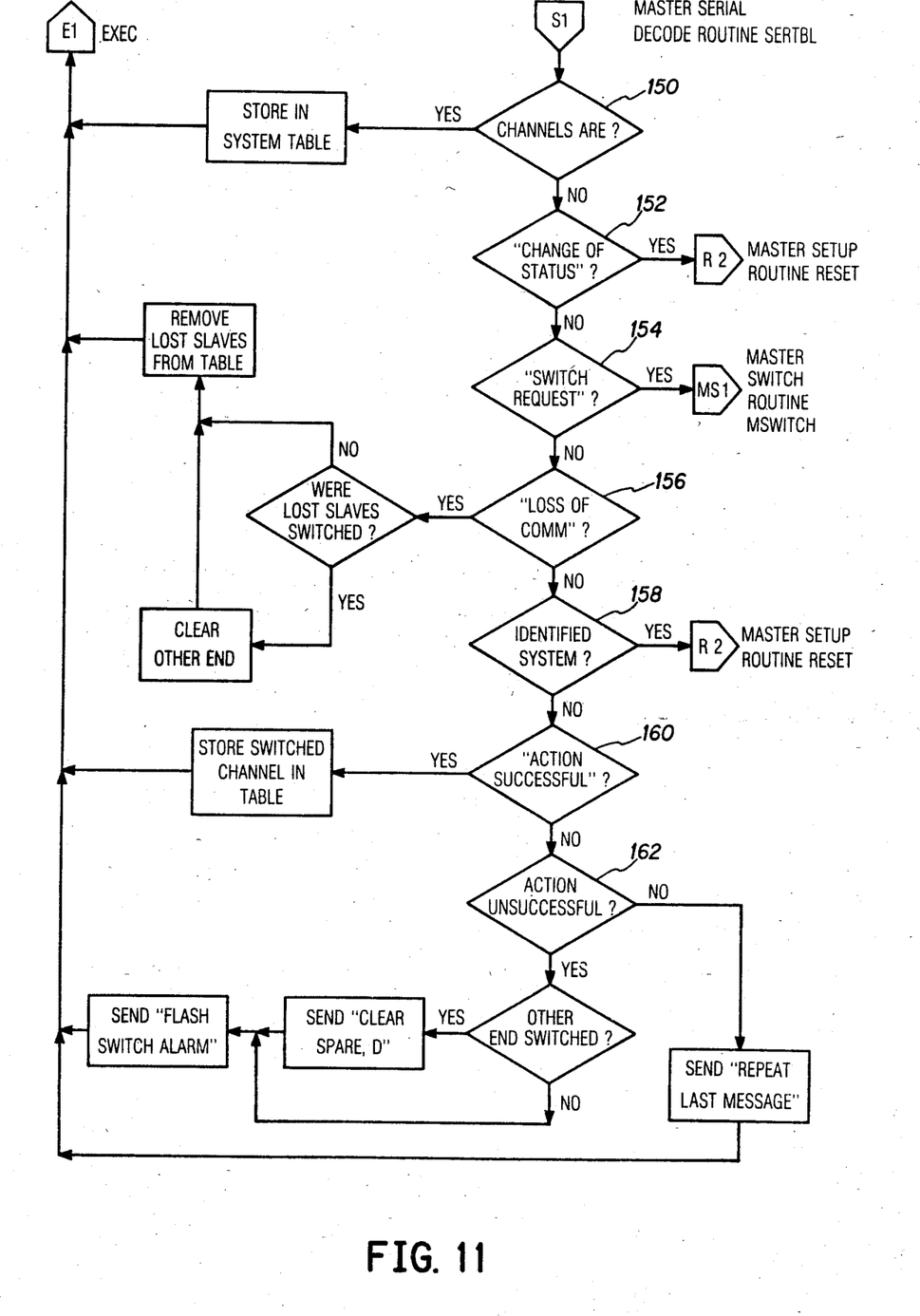

FIG. 6 is a master setup routine which is accessed from the flow diagram of FIG. 11 when the master receives either a change of status message or an identified system message. If the message received is an identified system message the block 98 stores the number of slaves and continues to block 100 and sends a report status for that particular slave controller. It checks various items and places each item in a table and increments the number so as to check the next unit according to block 102. When it has finished with the last slave, it returns to the executive routine of FIG. 9. If the message is "change of status", some of the steps of FIG. 6 are skipped but in general the same routine is followed.

FIG. 7 is a slave setup routine flow diagram followed if the unit decides that it is a slave in the flow diagram of FIG. 5. The slave sets up the east and west serial ports according to prescribed algorithms according to block 104 and then sends a change of status signal according to block 106 before proceeding to the executive routine of FIG. 9.

Figure 8:
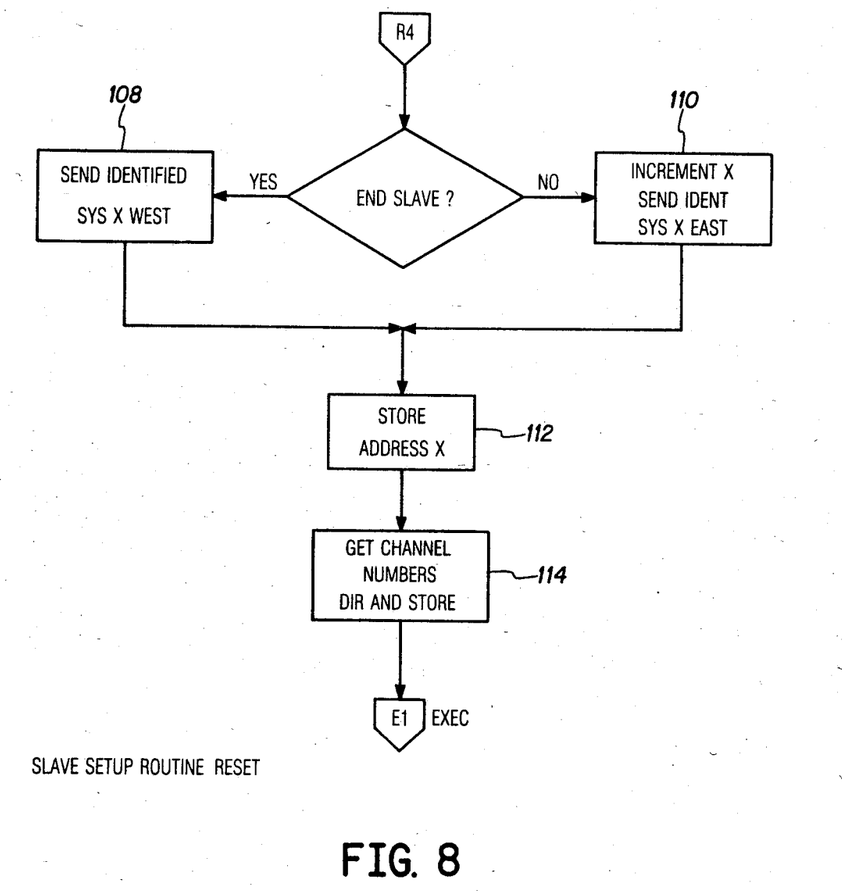
Figure 9:
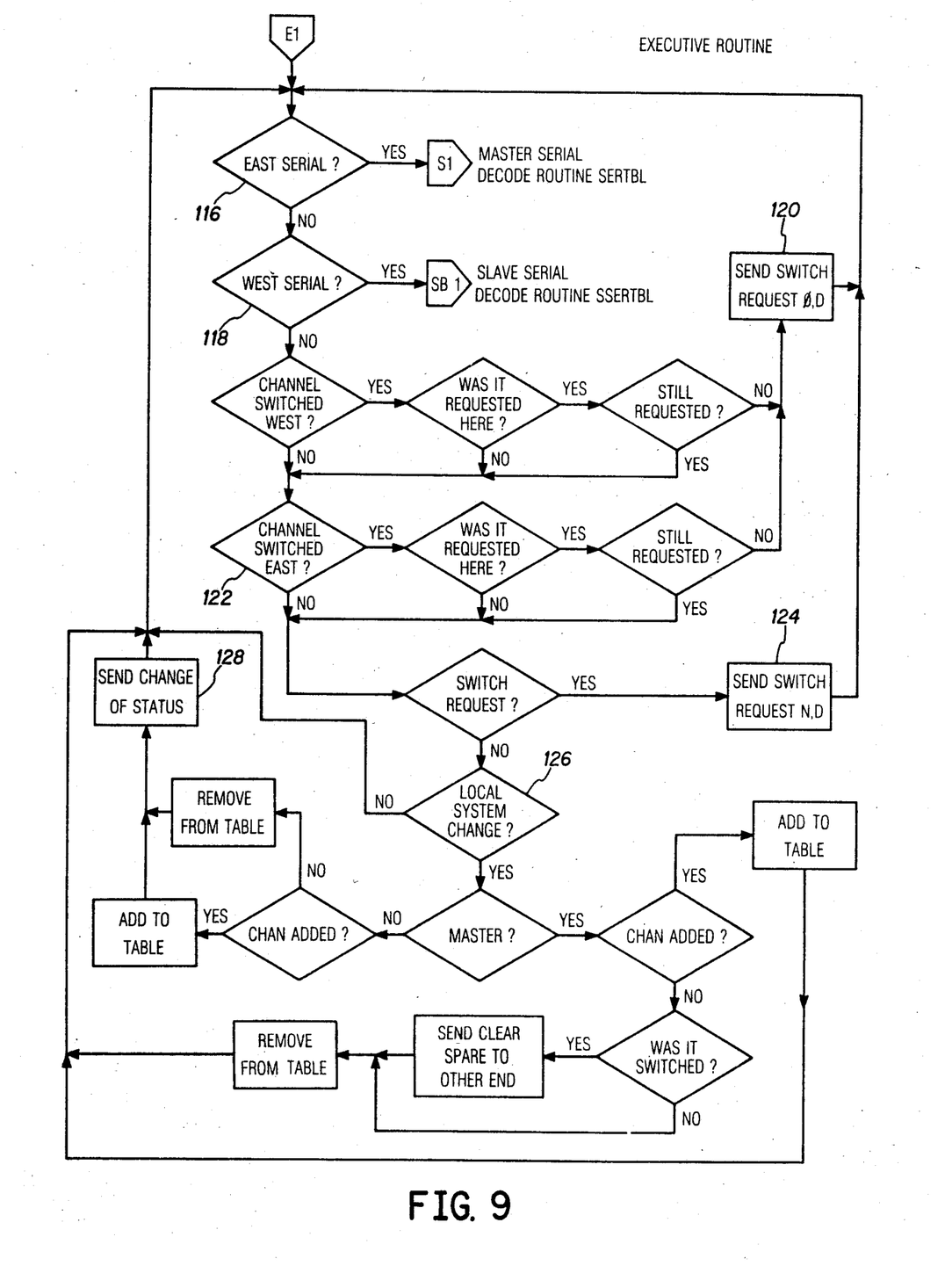
Figure 10:
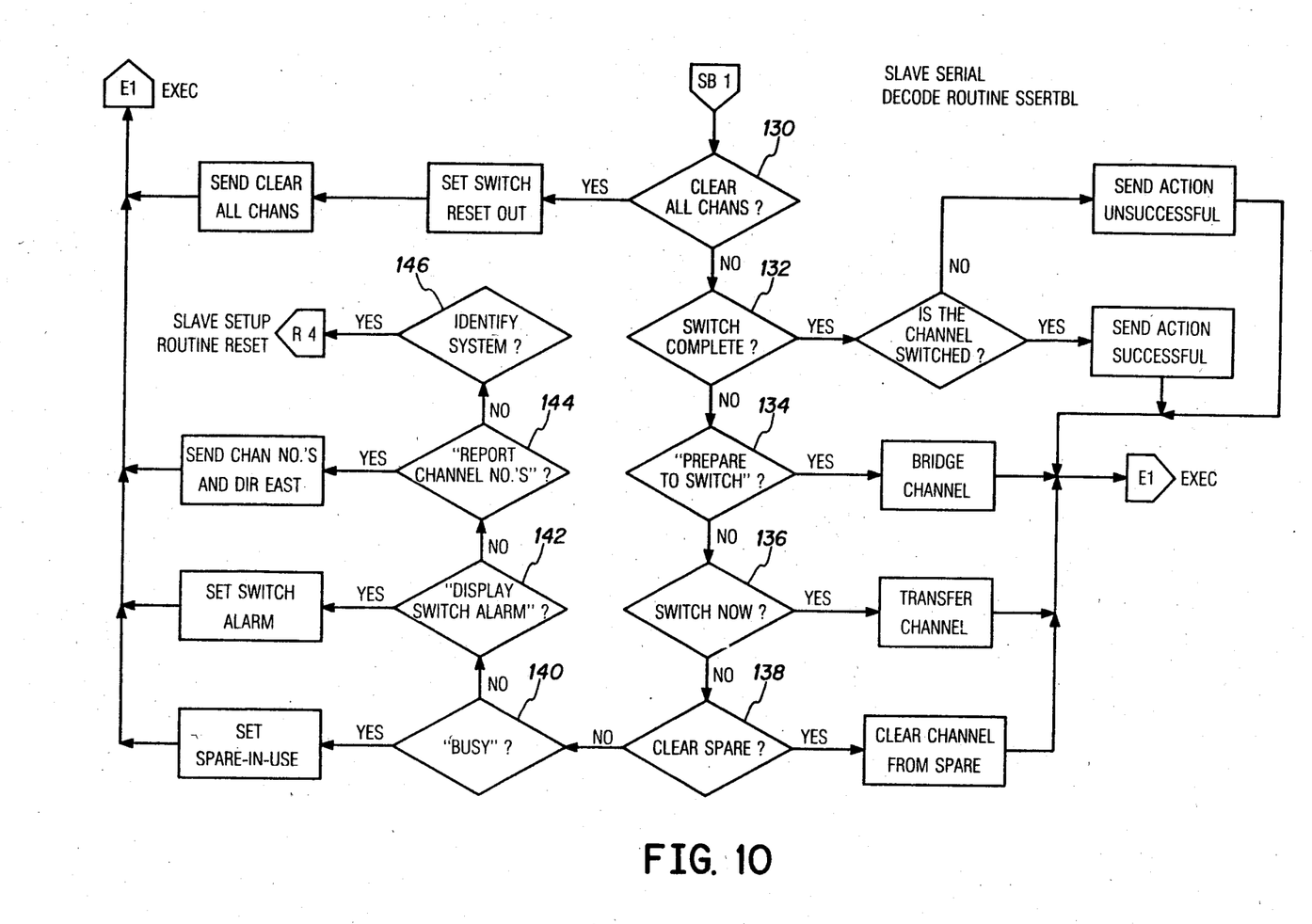

FIG. 8 is a further slave setup routine which is entered from FIG. 10 in response to a request by the master that the system be identified. The unit first checks to whether it's the end slave or not which it can determine if it has no east end terminal since the master is by definition a west end terminal and all intermediate slaves would have both east and west end terminals. If it's an end slave, it sends that identification according to block 108 and if it isn't, it sends the other identification according to block 110. In any event, the address is stored according to block 112 and each of the channel numbers, the direction in which they are activated, either east or west, is ascertained and this information is stored according to block 114. The unit then returns to the executive routine of FIG. 9.

After the initial setup, most of the time is spent in the loops of FIG. 9 where, upon entering, a check is made to see if there is a message awaiting service at either the east serial port or the west serial port according to decisions blocks 116 and 118. A master would never have a west serial port and therefore would never activate decision block 118. However, if there is a message at the east serial port, the unit, whether master or slave, proceeds to the actions identified in FIG. 11. A message occurring at the west serial port would cause the unit to proceed to the steps outlined in FIG. 10. If the particular unit has had a channel switched west to the protection channel, it checks to see whether it was requested by that unit and if so, if it still needs requesting or whether the channel has been cleared by personnel or due to the fact that it was merely a temporary problem. If it is no longer needed, a switch request to return to initial state is sent by block 120, and the unit returns to the beginning of the loop. Similar actions occur in the channel switched east block 122. If on the other hand, a switch request is required due to a recently occurred failure, the block 124 is activated to send a switch request to the master. The unit again returns to check the other items in the loop. If a switch request is not required, the unit checks to see if there has been a change in local system according to decision block 126. If there has been a change, the unit checks to see if it is a master or not. If it is a master, information is added to or subtracted from a table depending upon whether the change involved a channel added or switched or deleted. If it is not a master, a similar channel added or not added piece of information is ascertained, the information is altered in the slave units table and a change of status piece of information is supplied via a block 128 to the master, and the unit returns to the beginning of the executive routine loop.

FIG. 10 illustrates the slave serial decode message routine which is entered from the executive routine of FIG. 9. This routine uses a plurality of decision blocks 130 through 146 to ascertain which of a plurality of messages has been received. The unit reacts accordingly in following the instructions. After following the instructions, it returns to the executive routine of FIG. 9.

The steps of FIG. 11 are entered from FIG. 9 and comprise the master serial decode routine for decoding the various received messages as shown in decision blocks 150 through 162. The actions in response to decoding of each of these messages are illustrated and for the most part involve recording various information in portions of the configuration table except for the message of "action unsuccessful" where the master unit either sends a "repeat last message" or it checks various items and sends a message to the slave unit to switch on the alarm indication before returning to the executive routine of FIG. 9.

Figure 12:
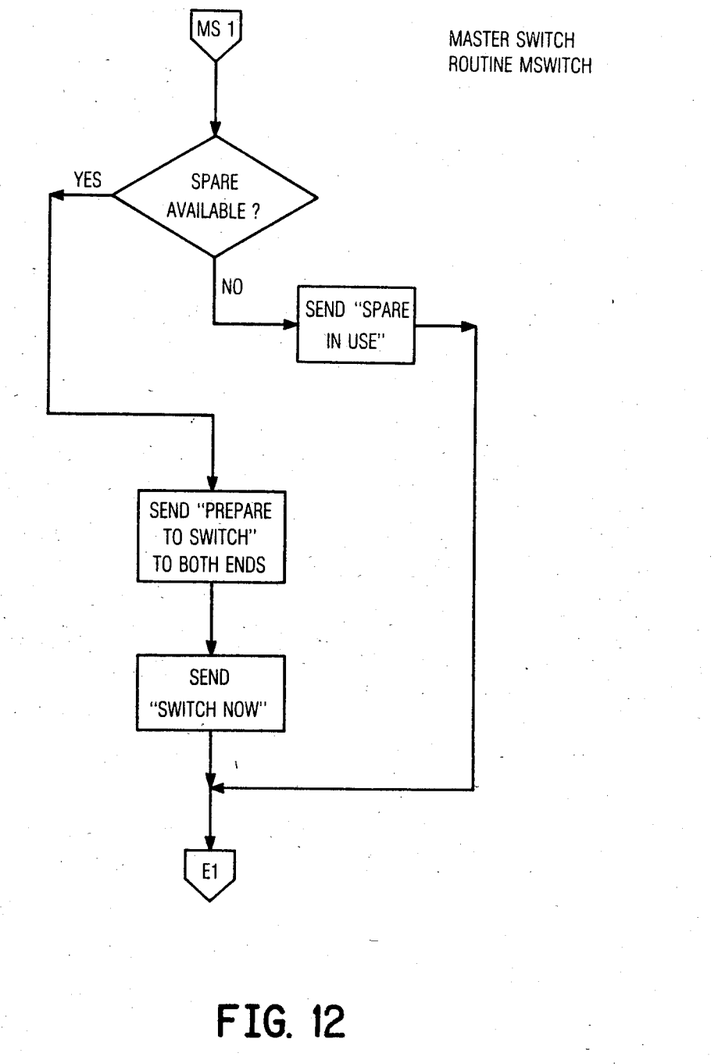

FIG. 12 is the master switch routine entered from FIG. 11 in response to the switch request message. In FIG. 12, the master checks to see if a spare is available in decision block 164, and if it is not the master sends a message to that effect as illustrated in block 166. If there is a spare available, a message is sent in accordance with block 168 to the slave controllers on opposite ends of the circuit to be bridged and then returns to the executive routine of FIG. 9.

OPERATION

The protection switching scheme for the present application is accomplished by a system of microcomputers serially interconnected between east and west and terminal locations. A main or master switch control module is located at one end of the system defined as west. The master switch control module interrogates the satellite or slave switch control modules at all other sites in the communication system which have data drop an insert channels to define a complete system of interconnects and to regulate the protection channel usage. Each switch control module polls each terminal point at its location for transmission problems and reports these problems to the master. The master will act accordingly.

From the above, it will be apparent that the master switch control module is the system's supervisor. It interrogates all other switch control modules in the system to determine which channels terminate at each slave location. The information gleaned from this interrogation is stored in a lookup table to allow the master to determine which terminal points to switch when a transmission fault occurs. The internal table in the master switch control module also allows the master to determine which parts of the protection channel are in use so as to allow other problem channels to utilize the remaining sections of the protection channel if possible. The master switch control module also performs the slave function as described below at the west end location.

The slave switch control modules act under the direction of the master switch control module. No switching is performed without specific direction from the master. The slave monitors the terminal points at its location for an alarm indication. When an alarm indication occurs, the slave will request that a given channel in a given direction needs switching to the protection channel. If the protection channel is available for that span, the master switch control module will notify the slave at the other end of the given channel that a switching action is about to occur. The master then notifies both slave units to switch. If the spare channel or protection channel is busy, the master will notify the requesting slave and no other action is taken. If the alarm clears after switching has been completed, the slave will request that it be returned to the original switch configuration. This operation follows the same steps as outlined above.

As previously mentioned, and as illustrated in FIG. 1, the prior art is represented by FIG. 1. Office A would be the west end and Office D would be the east end. The intermediate offices are represented as Offices B and C. At each location intermediate the end terminals or Offices A and D, each of the lines are terminated anytime one or more channels are dropped. Thus, whenever there is a failure of a line such as on channel 2 between Offices C and D, there will be a like section of protection channel which if not presently being used, can be switched to bridge the failed channel. If, on the other hand, the protection channel for that segment is being used, there is no further action that need be taken. No master is required since any individual office or switching site can easily ascertain whether or not a given section of protection channel is being utilized and thus is not available.

However, the system of FIG. 1 in using terminating devices for each line at each intermediate terminal requires a large amount of expensive switching equipment.

The present invention utilizes repeaters on those channels which do not require the dropping or inserting of data. The repeater amplifiers are much less expensive both to build and to maintain and thus, there is considerable cost savings in the original installation and in the maintenance of the equipment. As illustrated, channel 1 does not have any dropping or inserting of data the entire distance between the east and west ends of the communication link shown. Channel 2, on the other hand, has drop and insert capability at Office C and channel 3 has drop and insert capability only at Office B. It will thus be apparent that if there is a break anywhere in channel 1, the entire protection channel from Office A to Office D must be used to bridge the failed channel. On the other hand, if the section between Office A and Office B of channel 3 were to fail, only that corresponding section of the protection channel P would need to be used. This would leave a further section such as the section between Office C and Office D if the corresponding section of channel 2 were to fail.

The assumed failures are illustrated in FIG. 3 and with the illustrated configuration, it is obvious that any further failures could not be bridged since there is only one remaining section of protection line between Office B and Office C.

The circuitry for a through-repeater, such as shown, for channel 1 in Offices B and C, in one embodiment, costs approximately as much as each of the back-to-back terminals in Office C for channel 2. Thus, equipment cost is one-half for each channel drop site that can have a through-repeater instead of a pair of back-to-back terminals. However, the switching problem is somewhat more complicated. For the prior art switch of FIG. 1, when there is a failure, only two adjacent switch controllers have to talk to each other during a transfer operation. For the configuration illustrated in FIGS. 2 and 3, a failure detected at one terminal location causes a switch request to be generated to the master controller. To simplify the electronics as well as the algorithm for managing the system, the master is situated at one end terminal which by definition for the invention is the west terminal. To complete a transfer, the other end of the switching span must be located. If a failure is detected in Office D of channel 3 and which, as illustrated is the east end, then the west end of channel 3 must be located. The problem is that channel 3 has two west ends, one at Office A and one at Office B. The proper end office is Office B and the only way to determine this is that Office B is the first west end to be found in the system on channel 3 starting from Office D.

To determine which terminal is the appropriate far end for transferring, the controller at Office D must either know or be told where the other end is. Thus, the present invention designates the west end of the system as a master and the master is the system supervisor. It interrogates all other switch controller modules in the system to determine which channels terminate at each location and the direction of signal flow from that terminal.

The master is required to know how the system is configured and the master stores this information in a configuration table. When any terminal detects a failure the switch controller at that site communicates the failure as a request to transfer. The master then looks at the configuration table to determine where the other end of the switching span is and issues transfer commands to both ends. By having the master at the west end in Office A incorporating a configuration table, many problems are solved. Now every site does not have to know the status of every other site and the coordination of multiple switch requests is easier.

As designed, if a transfer request is generated simultaneously on channel 3 at Office D and on channel 2 at Office A, both would require the protect channel P between Offices B and C. Since the switch controller involved in the transfer of channel 2 is not the same as the switch controller involved in the transfer of channel 3, determination of the channel to be transferred would be extremely difficult. With a single master, the problem becomes much simpler since the master is a single entity determining the requirements of a transfer request and can handle the requests, as received, in a preordered sequence.

As will be realized, for the configuration table in the master to be useful, the table must match the configuration of the system. This means that the table must be updated every time there is a change in the configuration of the system. To make the system easy to operate, the master has been designed to self-learn the system on initial power-up as shown in the flow diagram beginning in FIG. 5 and proceeding to FIG. 9. Further, the master periodically checks every site for a change in the number of channels equipped and for sites added or deleted.

On initial power-up of the system, the master at the west end sends out a message to the first slave controller on the system such as controller 66 as illustrated in FIG. 4. This message contains a zero address which informs the slave that it is the first slave in the power-up sequence. The first slave 66 then sends to the next slave 72 in sequence the same message it received from the master except that the address will be the address of the next site. This scheme works because all messages from the master to any slave must be repeated by all intermediate slaves. Therefore, as the initialization command propagates down the system, each site in turn receives its correct address contained in the command. The end slave 74 receives the initialization command and responds that it is an end slave. The end slave does not have any transmission equipment attached to its east port and therefore knows that it is an end slave.

After the end slave 74 responds to the initialization command, the master polls each site to find out the number of channels equipped at that site and the direction of each channel. This completes the building of the configuration table in the master. Now the master sends a command down the system that informs each slave that the system is ready for operation. Only after this last command is received will the slaves initiate any transfer requests. The system is fully operational at this point. As may be surmised, all intercontrol unit communications occur on the protection channel P. The failure of the protection channel does not cause any untoward problems since if there is no protection channel available for bridging failed channels, there is little reason to have any communication between controllers.

Once the configuration table in the master has been established, it must be maintained. This is accomplished by periodic polling of each slave by the master. Although this periodic step is not shown specifically in the flow diagram, the same general process is followed as used to initially set up the table. The master sends a command to the first slave and tells that slave what the state of each channel should be. The master then requests the status of the channels at that site. If a channel is transferred and it does not show as being transferred in the configuration table, then a restore command is sent to both ends of the transferred channel to restore the channel to its normal condition. If the channel should have been transferred due to a failure, then a transfer request will immediately be generated by one of the ends of the channel. The master will then transfer the channel and update its configuration table.

When the master controller polls a site that has a channel transferred, it tells that slave that the channel should be already transferred and asks for its actual status. If the slave responds with the correct status, the master goes immediately to the other end of the transferred channel and verifies that the opposite end has it transferred. At this time the master would resume its site-by-site polling where it left off. Therefore, any transferred channel is checked twice, once from each end. If the slave responds that the channel is not transferred, the master issues a restore command and each end of the channel is restored. If the channel should really have been transferred due to a failure, then a transfer request will immediately be generated by one of the ends of the transfer. The master will then transfer the channel and update its configuration table. In this way, the master has reconciled differences between the configuration table and the actual system. For any difference between the configuration table and the actual system, the master assumes the table is correct if the information in the table is rational according to prescribed standards. For nonrational information in the table, the channel involved is restored since the master can then respond to any transfer requests and correct the system and its table.

In addition to the periodic polling, each slave will notify the master immediately of any change in the configuration at its site. This is found in FIG. 9 under the Executive Routine whether the logic involved is a master or a slave.

It is believed that the above description and the clearness of the flow charts in FIGS. 5 through 12 constitute a complete description of operation of the apparatus from a logic standpoint.

Thus, further elaboration on these flow charts will not be provided.

Although only one embodiment of the inventive concept has been illustrated and described, it is believed clear that the inventive concept involves the use of master controller communicating over a protection channel to a plurality of slave controllers at all other intermediate and end sites of a switching system wherein the switching system utilizes channel signal through-repeaters on any intermediate site between end sites where there is no dropping or inserting of data. The appropriate control of this system in bridging failed channels with protection channels comprises the inventive concept.

However, I wish to be limited not by the apparatus shown and described but only by the scope of the appended claims wherein I claim:

1. An interexchange communication system including a plurality of signal insert and drop sites wherein at least some of the insert and drop sites comprise a mixture of through-repeaters and terminals comprising, in combination:

west signal terminal insert and drop site means having signal termination means for each signal comprising a part of the interexchange communication system;

master switch control module means located at said west signal terminal means for supervising the entire communication system and including an east serial port for receiving slave request and reply messages and sending master commands;

east signal terminal insert and drop site means having signal termination means for each signal comprising a part of the interexchange communication system;

slave switch control module means located at said east signal terminal means including a west serial port for sending slave messages and receiving master commands;

at least one intermediate signal insert and drop site means including a mixture of terminal means and through-repeater means;

slave switch control module means, located at all intermediate signal insert and drop site means including a west serial communications port for sending slave messages from said slave module means, echoing received slave messages from downstream slave modules, and receiving master commands and further including an east serial port for receiving slave messages to be echoed upstream to the master module means, and for echoing received master command messages to downstream slave modules, connected to terminal means at that site for controlling signal paths therethrough;

means at each site for ascertaining failure of a received signal at a terminal at that site whereby a slave message may be sent to said master module means requesting assignment of a protection channel;

a plurality of communication channels extending from said west site means to said east site means wherein some of the channels do not terminate at every site in between but rather have sections containing through-repeaters at some sites;

spare protection signal channel means extending from said west site means to said east site means with intermediate terminal means at each intermediate site requiring spare signal protection; and means, including communication channel means, for interrogating each said slave control module means at each site by the master module means to ascertain the system configuration of terminals and through repeaters for each signal channel whereby, upon notification of said master module means by the associated slave module means of a failure of a signal channel, the master control module can command two of the control modules to switch in the shortest possible length of protection channel to bypass the failed section thereby leaving sections of the protection channel to service other failed sections between said west and east terminal site means.

2. Apparatus as claimed in claim 1 comprising, in addition:

system means where, for normal operation, a slave module waits for a poll from the master module before supplying information to said master module means; and means incorporated in each control module means for transmitting changed configuration status at that site to said master control module means immediately without waiting for the next poll.

3. Apparatus as claimed in claim 1 comprising, in addition:

means for transmitting all communication messages between master and slave modules within an overhead bit structure on said protection channel means.

4. The method of reducing component cost in a multisite, serially connected set of communication links forming a switching system comprising the steps of:

terminating only those data channels of data at a site in a serial communication link that require dropping or inserting of data and through-repeating the remaining channels;

maintaining a configuration table of the system at a first end of the system in a master controller;

providing a protection channel for data transmission from the first end of the system to the opposite end with termination means at each intermediate site;

polling a slave controller at each termination site to ascertain the status changes in the system using overhead bits on the protection channel for the polling operation;

requesting the master controller that a protection channel be assigned when a signal failure is detected by a slave controller;

commanding the slave controllers at sites terminating the failed signal channel section to switch the failed channel to the protection channel after the master controlle has checked the configuration table to ascertain the termination sites for the failed signal channel and has ascertained that that section of the protection channel is available; and immediately notifying the master controller without waiting for a poll that there has been a change in status of the system as seen by an individual slave controller at a site.

5. Apparatus for reducing component cost in a multisite, serially connected set of communication links forming a switching system comprising, in combination:

a plurality of signal channel serially interconnected site first means having channel terminations for only those data channels at the sites that require dropping or inserting of data and having through-repeaters for the remaining data channels at those sites;

master controller second means for maintaining a channel equipment configuration table of the system at a first end site of the system;

protection channel third means serially connecting each site in the system for data transmission from the first end of the system to the opposite end and having termination means at each intermediate site;

a plurality of slave controller fourth means located one per site other than the site including said master controller second means;

fifth means included in said master controller second means for polling a slave controller at each termination site to ascertain the status changes in the system using overhead bits on the protection channel;

sixth means comprising a part of said fourth means for requesting the master controller second means that a protection channel be assigned when a signal failure is detected by a given one of said plurality of slave controller fourth means;

seventh means comprising a part of said master controller second means for commanding the slave controller fourth means at sites terminating the failed signal channel section to switch the failed data channel to the protection channel third mean after the master controller second means has checked said configuration table to ascertain the termination sites for the failed signal channel and has ascertained that that section of the protection channel is available; and eighth means comprising a part of each of said slave controller fourth means for immediately notifying said master controller second means without waiting for a poll that there has been a change in status of the system as seen by an individual slave controller fourth means at that site.

* * * * *